Dec. 1, 1931.  W. O. THEWES  1,833,980
PIPE CUTTER
Filed Aug. 25, 1926
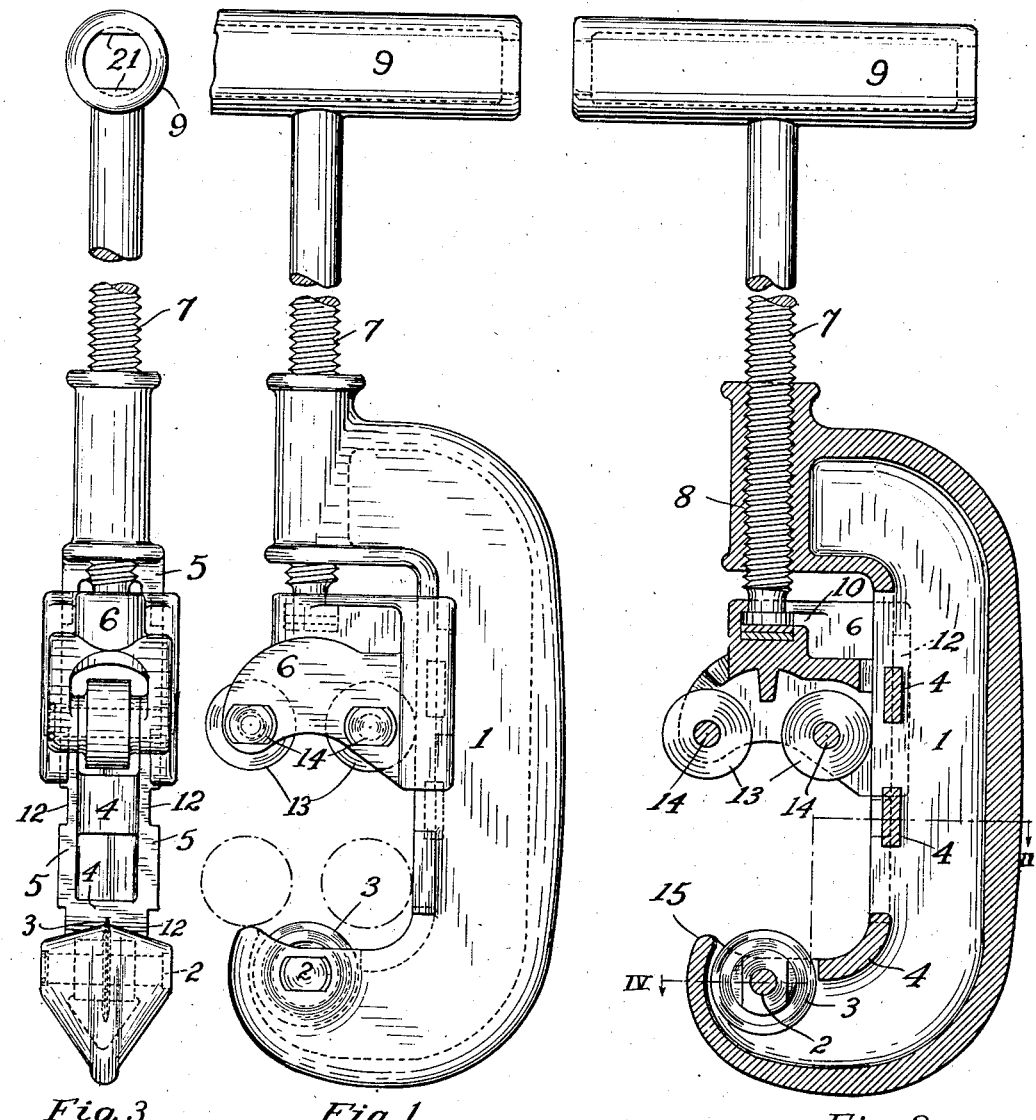
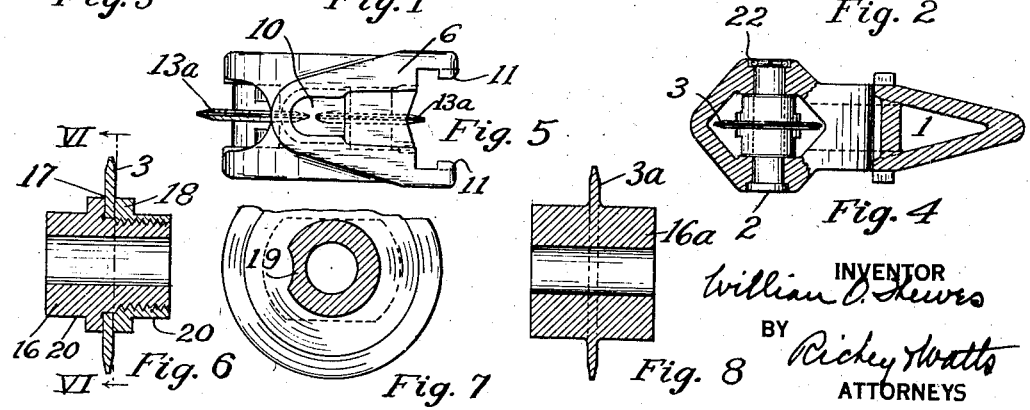

Patented Dec. 1, 1931

1,833,980

UNITED STATES PATENT OFFICE

WILLIAM O. THEWES, OF NORTH RIDGEVILLE, OHIO

PIPE CUTTER

Application filed August 25, 1926. Serial No. 131,399.

This invention relates to a pipe cutter.

An object of the invention is to provide a cutter which may be operated with very little expenditure of energy.

Another object is to provide a cutter in which the blade or blades will be protected against breakage.

Another object is to provide means for easily removing or changing blades which will normally support and retain them properly in place.

Another object is to provide a cutter which may be readily and economically manufactured.

Another object is to provide a cutter handle which may be used as a socket wrench.

Other objects will hereinafter appear.

The invention will be better understood from the description of one practical embodiment thereof illustrated in the accompanying drawings, in which—

Fig. 1 is a side elevation of the pipe cutter;

Fig. 2 is a central longitudinal section thereof;

Fig. 3 is a front elevation;

Fig. 4 is a section taken on line IV—IV of Fig. 2;

Fig. 5 is a top view of the slide provided with blades instead of rollers;

Fig. 6 is an axial section of the cutting blade and hub;

Fig. 7 is a section on the line VII—VII of Fig. 6; and

Fig. 8 is a view similar to Fig. 6 but showing a modified form of blade.

The cutter comprises a C-shaped frame 1 provided at one end with a stationary pin or shaft 2 for a cutting blade 3. Preferably, the frame is of V-shaped cross section as shown in Fig. 3 and may be stiffened by transverse struts 4 which may conveniently be cast integrally therewith.

Along the outer edges of the frame extend flanges 5 which serve as ways for a cross head or slide 6 movable toward and from blade 3, the slide being moved by a screw 7 threaded at 8 through the opposite end of the frame and actuated by a handle 9.

The slide is preferably of one piece and has in its top an inwardly extending recess 10 for the reception of the headed end of screw 7. On the inner side of the slide are inwardly extending flanges 11 which in assembled position engage the flanges 5 of the frame. Both sets of flanges have sections cut away as at 12 to permit the slide being moved laterally at its position nearest the cutter blade to engage or disengage the flanges.

Two rollers 13 are carried by the slide and adapted to engage a pipe on the side opposite to the cutter blade. Where the cutter is to be used in places in which it cannot be moved completely around the pipe the rollers may be replaced by additional cutter blades as shown at 13a in Fig. 5. The rollers rotate on pins 14 similar to pin 2.

The frame extends below and beyond the cutter blade and protects this on every side except that toward the slide. The frame terminates in an upwardly extending lip 15, so positioned that one of the rollers 13 will contact with it before either can touch the blade, these rollers, in their extreme position, being indicated by the dot and dash circles in Fig. 1. This also prevents the flanges 11 becoming aligned with notches 12, except when the outer roller is removed, and thus prevents accidental lateral displacement thereof.

The cutters are preferably made as shown in Fig. 6 and each consists of a narrow blade mounted on a hub 16 which has a shoulder 17 supporting one side of the blade, the other side being engaged by a nut or sleeve 18 threaded on the hub. The hub is notched as shown at 19 and the blade has a projection engaging this notch to prevent it from rotating on the hub and thus loosening the nut. Both the hub and sleeve are provided with flattened surfaces 20 for engagement by a wrench.

A convenient wrench for the cutter parts is provided by flanging the ends of the tubular handle inwardly and cutting the flanges away to leave openings provided with flattened sides 21 adapted to fit the flattened portions of the hub and sleeve.

In Fig. 8 a modified form of blade 3a is shown which is made integrally with its hub 16a.

The pins 2 and 14 are each provided at one end with a head having flattened sides which are received in recesses, so that the heads are protected from contact with external objects and the pins kept from turning and consequently wearing the apertures in the frame and slide. The smaller ends of the pins are provided with peripheral grooves and have spring rings 22 therein to retain the pins in place. These ends are also positioned in recesses to prevent displacement of the pins by contact with external objects.

While I have described the illustrated embodiments of my invention with some particularity, it is obvious that many other embodiments will readily occur to those skilled in this art and I do not, therefore, limit myself to the precise details shown and described, but claim as my invention all such embodiments and all variations and modifications thereof coming within the scope of the subjoined claims.

I claim:

1. A pipe cutter including a substantially C shaped frame of hollow cross section, a screw threaded through one end thereof, guides on the intermediate portions of the frame, a slide movable along the said guides by said screw, the wall of the frame removed to form a recess in the end of the frame opening toward the inside of the C, a rotatable cutting blade journaled in said recess, the frame surrounding the blade on all sides except that towards the slide and having a projection at the extremity of the C adapted to engage the slide roller and prevent the slide from contacting the blade.

2. A pipe cutter including a frame of hollow V shaped cross section, a screw threaded through one end thereof, guides on the intermediate portion of the frame and a slide movable along the said guides by said screw, the wall of the frame removed to form a recess in the end of the frame opening toward the inside of the C, a rotatable cutting blade in said recess, the frame surrounding the blade on all sides except that towards the slide and having a projection at the extremity of the C adapted to engage a roller upon the slide and prevent the slide from contacting the blade.

3. A pipe cutter including a substantially C-shaped frame, guides on said frame, a slide movably mounted on said guides, a cutting blade mounted in one extremity of the frame, means for advancing and retracting said slide relatively to said blade, one or more rollers on said slide, and a projection formed on the frame adjacent the cutting blade and adapted to engage one of said rollers and prevent the latter from contacting with the blade.

4. A pipe cutter including a substantially C-shaped frame, guides on said frame, a slide movably mounted on said guides and having one or more rollers rotatably mounted therein, a cutter blade rotatably mounted in one extremity of the frame, means for advancing and retracting said slide relatively to said blade, and a projection formed on the frame adjacent the cutting blade adapted to engage a slide roller and prevent the latter from contacting the blade.

5. A pipe cutter including a substantially C-shaped frame of hollow cross section, a screw threaded thru one end thereof, guides on the intermediate portion of the frame, a slide movable along the said guides by said screw, the wall of the frame being removed to form a recess in the end of the frame opening toward the inner side of the C, a rotatable cutting blade journaled in said recess, the frame surrounding the blade on all sides except that towards the slide and having a projection adjacent the cutter adapted to engage the slide roller and prevent the latter from contacting the blade.

6. A pipe cutter including a substantially C-shaped frame of hollow cross section, guides on the intermediate portion of the frame, a slide movably mounted on said guides, a pair of rollers on said slide, a screw threaded through one end of the frame for advancing and retracting said slide, the one end wall of the frame being formed with a recess opening toward the inner side of the frame, a rotatable cutting blade journaled in said recess, the frame surrounding the blade on all sides except that towards the slide and having a projection adapted to engage one of the slide rollers and prevent the roller from contacting the blade, said screw terminating in a handle serving also as a wrench for the cutter parts.

In testimony whereof I hereunto affix my signature this 21st day of August, 1926.

WILLIAM O. THEWES.